(12) United States Patent
Febvay et al.

(10) Patent No.: US 11,597,264 B2
(45) Date of Patent: Mar. 7, 2023

(54) WINDOW SURROUND FOR A VEHICLE

(71) Applicant: Magna Engineered Glass Europe S.à.r.l., Hûmes-Jorquenay (FR)

(72) Inventors: Patrick Febvay, Langres (FR); Kévin Banasiewicz, Champigny les Langres (FR)

(73) Assignee: Magna Engineered Glass Europe S.à.r.l., Hûmes-Jorquenay (FR)

( * ) Notice: Subject to any disclaimer, the term of this patent is extended or adjusted under 35 U.S.C. 154(b) by 373 days.

(21) Appl. No.: 17/021,031

(22) Filed: Sep. 15, 2020

(65) Prior Publication Data
US 2021/0078393 A1   Mar. 18, 2021

(30) Foreign Application Priority Data

Sep. 18, 2019 (EP) ..................................... 19197966

(51) Int. Cl.
*B29C 45/16* (2006.01)
*B60J 10/23* (2016.01)
(Continued)

(52) U.S. Cl.
CPC ................ *B60J 10/23* (2016.02); *B29C 33/00* (2013.01); *B29C 45/14434* (2013.01); *B29C 45/1671* (2013.01); *B29C 45/1676* (2013.01); *B29C 65/00* (2013.01); *B60J 10/15* (2016.02); *B60J 10/21* (2016.02)

(58) Field of Classification Search
CPC .......... B29C 45/1676; B29C 45/14434; B29C 45/1671
See application file for complete search history.

(56) References Cited

U.S. PATENT DOCUMENTS

| 4,830,804 A | * | 5/1989 | Weaver ................. B29C 70/763 |
| | | | 264/161 |
| 4,953,331 A | | 9/1990 | Ziegler et al. |

(Continued)

FOREIGN PATENT DOCUMENTS

| DE | 19539960 A1 | 4/1997 |
| DE | 29823612 U1 | 9/1999 |

(Continued)

OTHER PUBLICATIONS

European Search Report for European Patent Application No. 19197966.5, dated Feb. 12, 2020, 5 pages.

*Primary Examiner* — Edmund H Lee
(74) *Attorney, Agent, or Firm* — Jordan IP Law, LLC; Todd A. Vaughn

(57) ABSTRACT

A method of manufacturing a window surround for a vehicle, a window surround for a vehicle, and a device for manufacturing a window surround. The window surround includes a first component to serve as a circumferential support frame to hold a window glass panel, a second component, composed of a material of less hardness than the material of the first component, onto the first component, to serve as a circumferential sealing element, and a third component that is composed of a high gloss material. The method includes injection molding the first component onto a window glass panel, then injection molding the second component onto the first component, and then injection molding the third component onto the first component.

11 Claims, 4 Drawing Sheets

(51) Int. Cl.
*B60J 10/15* (2016.01)
*B60J 10/21* (2016.01)
*B29C 45/14* (2006.01)
*B29C 65/00* (2006.01)
*B29C 33/00* (2006.01)

(56) References Cited

U.S. PATENT DOCUMENTS

| | | | |
|---|---|---|---|
| 5,197,243 A * | 3/1993 | Mozawa | B60J 1/02 52/208 |
| 5,620,648 A * | 4/1997 | Volkmann | B60J 10/34 264/254 |
| 6,250,017 B1 | 6/2001 | Tessier | |
| 9,689,194 B2 * | 6/2017 | Verrat-Debailleul | E06B 1/04 |
| 11,148,615 B2 * | 10/2021 | Husek | B60R 13/0243 |
| 2003/0205918 A1 | 11/2003 | Carvalho et al. | |
| 2008/0191517 A1 | 8/2008 | Kreye | |
| 2012/0144751 A1 | 6/2012 | Schapitz | |
| 2019/0232769 A1 | 8/2019 | Lorig et al. | |

FOREIGN PATENT DOCUMENTS

| | | | |
|---|---|---|---|
| DE | 102009031006 A1 | | 12/2010 |
| FR | 3096320 | * | 11/2020 |
| WO | WO2005044606 | * | 5/2005 |
| WO | 2006067622 A1 | | 6/2006 |
| WO | WO2012153234 | * | 11/2012 |
| WO | 2018172194 A1 | | 9/2018 |

* cited by examiner

WINDOW SURROUND FOR A VEHICLE

CROSS-REFERENCE TO RELATED APPLICATIONS

The present disclosure claims priority under 35 U.S.C. § 119 to European Patent Publication No. EP 19197966.5 (filed on Sep. 18, 2019), which is hereby incorporated by reference in its complete entirety.

TECHNICAL FIELD

The present disclosure relates to a window surround for a vehicle, a method of manufacturing a window surround, and a device for manufacturing a window surround.

BACKGROUND

Window surrounds, encapsulating glass panels, are used, together with the inserted glasses, as windows in vehicles and are generally known in the art.

The window surround is typically bonded to the window glass panel via a primer. Said differently, the window surround usually bonds to a primer, which is bonded to the glass, thereby bonding the window surround to the glass panel.

Meanwhile it is also known to construct vehicle windows without using primer. The glass is then held by form-fit, typically on three sides at the edges of the glass panel, in a frame-like manner.

It is also known that such window surrounds can be constructed using two different materials, a hard, more rigid, material that serves as a support frame to hold the glass panel by form-fit. And a second, less rigid material, that serves as a sealing to the further surrounding area of the window surround.

Such window surrounds are often produced by extrusion, but it is also known to use injection-molding techniques.

Injection-molded window surrounds are revealed for example by German Patent Publication No. DE 195 39 960 A1.

From German Patent Publication No. DE 298 23 612 U1 it is known, that a trim strip can be attached to a window surround using form fit.

SUMMARY

Provided in accordance with one or more embodiments are an improved method of manufacturing a window surround, an improved window surround, and a device that is suitable to manufacture such improved window surrounds. In particular, the window surround shall be equipped with a trim strip in a simple and cost effective manner.

In accordance with one or more embodiments, a three component (3K) injection process is performed to fabricate a window surround for a vehicle.

In accordance with one or more embodiments, a method of fabricating a window surround for a vehicle comprises: injection molding a first component composed of a hard first material onto a window glass panel, the first component comprising a circumferential support frame to hold the window glass panel; injection molding, after injection molding the first component onto the window glass panel, a second component composed of a weak second material onto the first component, the second component comprising a circumferential sealing element; and injection molding, after injection molding the first component onto the window glass panel but before injection molding the second component onto the first component, a third component composed of a high gloss material onto the first component.

In accordance with one or more embodiments, a method of fabricating a window surround for a vehicle comprises: injection molding a first component composed of a hard first material onto a window glass panel, the first component comprising a circumferential support frame to hold the window glass panel; injection molding, after injection molding the first component onto the window glass panel, a second component composed of a weak second material onto the first component, the second component comprising a circumferential sealing element; and injection molding, after injection molding the first component onto the window glass panel but after injection molding the second component onto the first component, a third component composed of a high gloss material onto the first component.

In accordance with one or more embodiments, the first component of the window surround is adapted to hold the glass panel circumferentially. The holding of the glass panel is achieved by a form-fit and usually includes that the glass is clamped between the outer edges of the first component support frame.

In a first step of the 3K injection process, the first component, composed of a first material, is injection molded onto the window glass panel. Because the first component of the window surround is configured to hold the glass panel, it may generally have the shape of an open ring which surrounds the window glass panel. The first material may comprise Polypropylene (PP), or may comprise a first component that is Polypropylene with 30 percent glass fibre (PPGF30%), and/or the second component is a thermoplastic elastomer (TPE).

In a second step of the 3K injection process, the second component is molded over the first component. The second component comprises a circumferential sealing element composed of a material having a hardness that is less than the hardness of the first material.

In a third step of the 3K injection process, the third component is molded over the first component. The third component is composed of a high gloss, preferentially black material to serve as a trim strip for the window surround. The third component may be composed of a third material having a hardness that is greater than the hardness of the second material. The third material may comprise Polymethylmethacrylate (PMMA) or of Alpha-Methylstyrene Acrylonitrile (AMSAM), for example Luran® High Heat HH-120.

In accordance with one or more embodiments, the third component may be molded over the first component before or after the second component is molded over the first component. Therefore, the component that is made of high gloss material, and therefore preferentially builds a trim strip of the window surround, is simply over molded in a second shot or third shot over the hard first component.

In accordance with one or more embodiments, advantageously, at least one undercut or at least two undercuts may be formed in the first component. The third component may then be molded over the first component in a section of the undercut(s), so that the third component fills the undercut(s) of the first component.

In accordance with one or more embodiments, advantageously, the at least one undercut may be arranged directly adjacent to the window glass panel, so that the third component which fills the undercut(s) is in direct contact with the window glass panel.

In accordance with one or more embodiments, advantageously, at least in a first section of the third component, the third component may be molded over the first component and the second component may be molded over the third component. The third component therefore gets clamped between the first component and the second component.

In accordance with one or more embodiments, advantageously, the first component may be formed as a U-shaped frame comprising a pair of spaced apart arm members extending from a base member. The window glass panel may penetrate the outer surface of the base member of the U-shaped frame, such that the U-shaped frame is a continuance of the plane of the window glass panel. The second component may be molded over the first component to directly contact a distal end of a first arm member of the U-shaped frame, and/or the third component may be molded over the first component to directly contact a distal end of a second arm member of the U-shaped frame.

In accordance with one or more embodiments, a window surround for a vehicle comprises a first component, composed of a first material, comprising a circumferential support frame to hold a window glass panel; a second component, composed of a second material of less hardness than the first material, onto the first component, arranged on the first component, the second component comprising a circumferential sealing element; and a third component, composed of a high gloss material, arranged on the first component.

In accordance with one or more embodiments, advantageously, at least one undercut or at least two undercuts may be formed in the first component. The third component may then be molded over the first component in a section of the undercut(s), so that the third component fills the undercut(s) of the first component.

In accordance with one or more embodiments, advantageously, the at least one undercut may be arranged directly adjacent to the window glass panel, so that the third component which fills the undercut(s) is in direct contact with the window glass panel.

In accordance with one or more embodiments, advantageously, at least in a first section of the third component, the third component may be molded over the first component and the second component may be molded over the third component. The third component therefore gets clamped between the first component and the second component.

In accordance with one or more embodiments, advantageously, the first component may be formed as a U-shaped frame comprising a pair of spaced apart arm members extending from a base member. The window glass panel may penetrate the outer surface of the base member of the U-shaped frame, such that the U-shaped frame is a continuance of the plane of the window glass panel. The second component may be molded over the first component to directly contact a distal end of a first arm member of the U-shaped frame, and/or the third component may be molded over the first component to directly contact a distal end of a second arm member of the U-shaped frame.

In accordance with one or more embodiments, a device for fabricating a window surround for a vehicle comprises, a device body that includes: a first cavity with a first injection unit for injection molding a first component composed of a first material onto a window glass panel, the first component comprising a circumferential support frame to hold the window glass panel, and a second cavity with a second injection unit for over molding a second component, composed of a second material of less hardness than the first material, onto the first component, onto the first component, the second component comprising a circumferential sealing element, and a third injection unit for over molding a third component composed of a high gloss material onto the first component.

In accordance with one or more embodiments, the device body may comprise a robot that is configured to insert the window glass panel into the first cavity and/or to remove the window glass panel with the first component from the first cavity and/or to insert the window glass panel with the first component into the second cavity and/or to remove the window glass panel with the first and second component from the second cavity and the mold.

Further advantageous embodiments and developments of the disclosure will become apparent from the dependent claims and from the description when considered together with the figures.

DRAWINGS

Embodiments will be illustrated by way of example in the drawings and explained in the description hereinbelow.

DESCRIPTION

Figure 1:
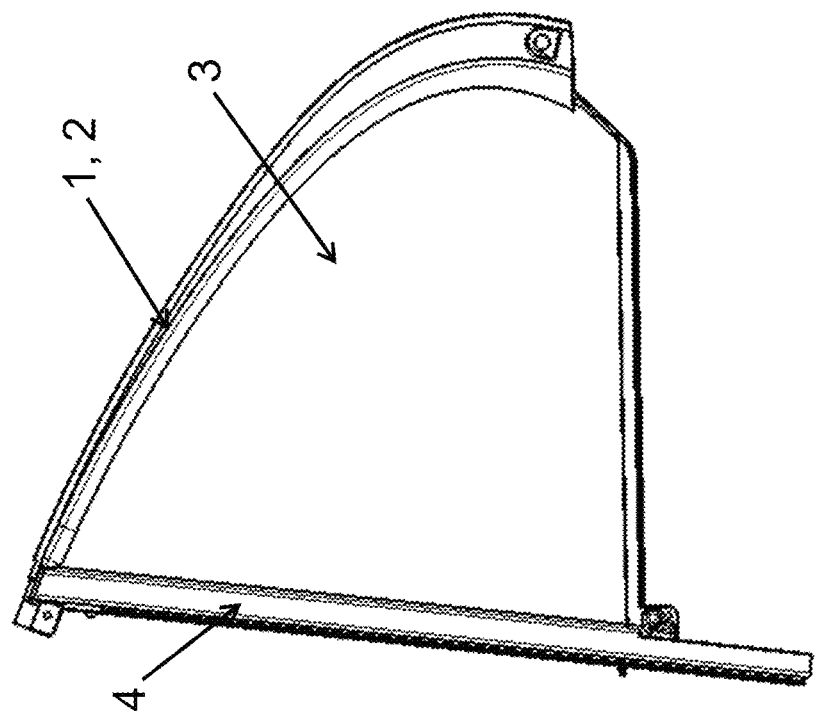
FIG. 1 illustrates a side view of window surround with an inserted window glass panel, in accordance with one or more embodiments.

As illustrated in FIG. 1 (in a side view such as could be seen from the side of a vehicle in an installation condition), a window surround comprises a first component 1 with an inserted window glass panel 3, a second component 2 that is over molded over the first component 1, and a third component 4 that is molded over the first component 1. The first component 1 of a window surround according to the invention together with an inserted window glass panel 3 in a side view.

The first component 1 is composed of a hard first material, such as, for Polypropylene (PP or PP with GF), or Polypropylene with 30 percent glass fibre (PPGF30%). The second component 2 is composed of a second material having a hardness that is less than the hardness of the first material, such as, for example, a thermoplastic elastomer (TPE family). Such a thermoplastic elastomer may comprise, for example, TPE TC6 WEZ 65ShA. The third component 4 is composed of a high gloss material, such as, for example Polymethylmethacrylate (PMMA) or Alpha-Methylstyrene Acrylonitrile (AMSAM).

The first component 1 comprises a circumferential support frame for holding the window glass panel 3. The first component 1 is injection molded onto the window glass panel 3. The second component 2 comprises a circumferential sealing element. The third component 4 comprises a trim strip of the window surround.

Figure 2:
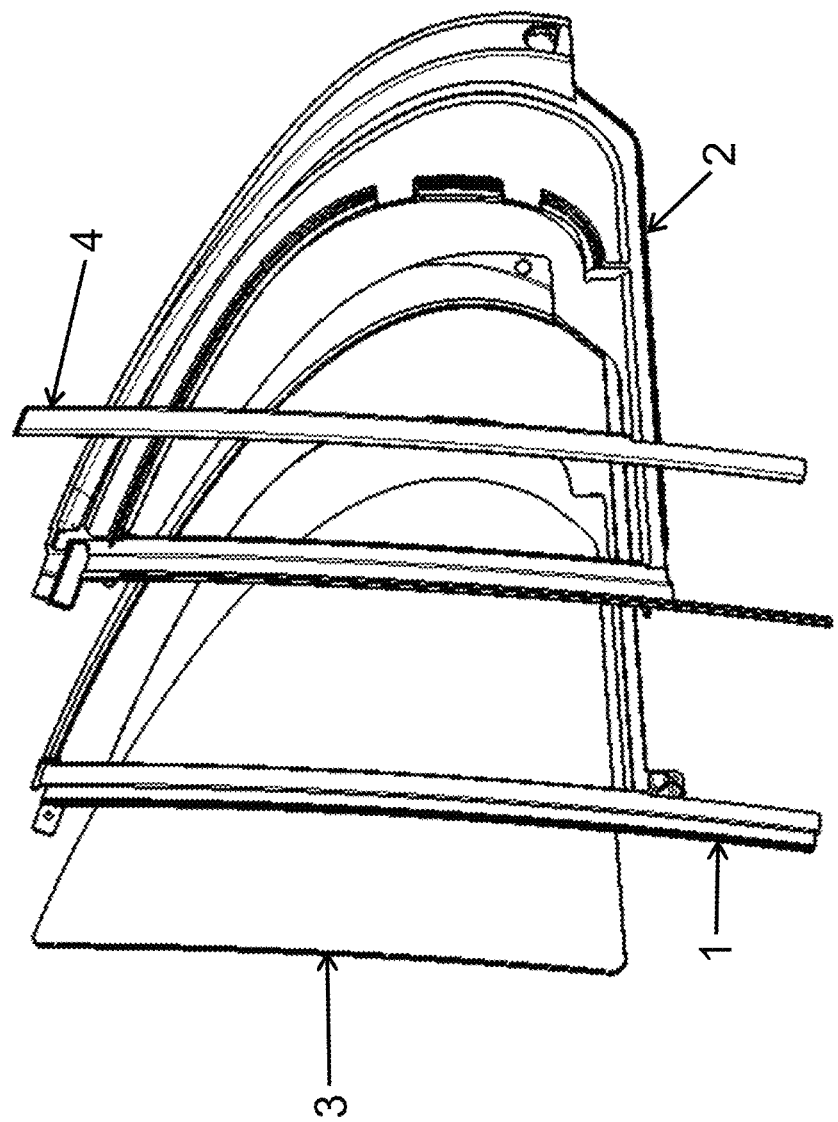
FIG. 2 illustrates an exploded view of the window surround of FIG. 1.

FIG. 2 illustrates the components that collectively form the window surround, namely the first component 1, the second component 2, and the third component 4. The third component 4 may essentially have the structural configuration or cross-section of a straight bar or strip, whereas the first component 1 and the second component 2 have respectively may essentially have the structural configuration or cross-section of a frame.

Figure 3:
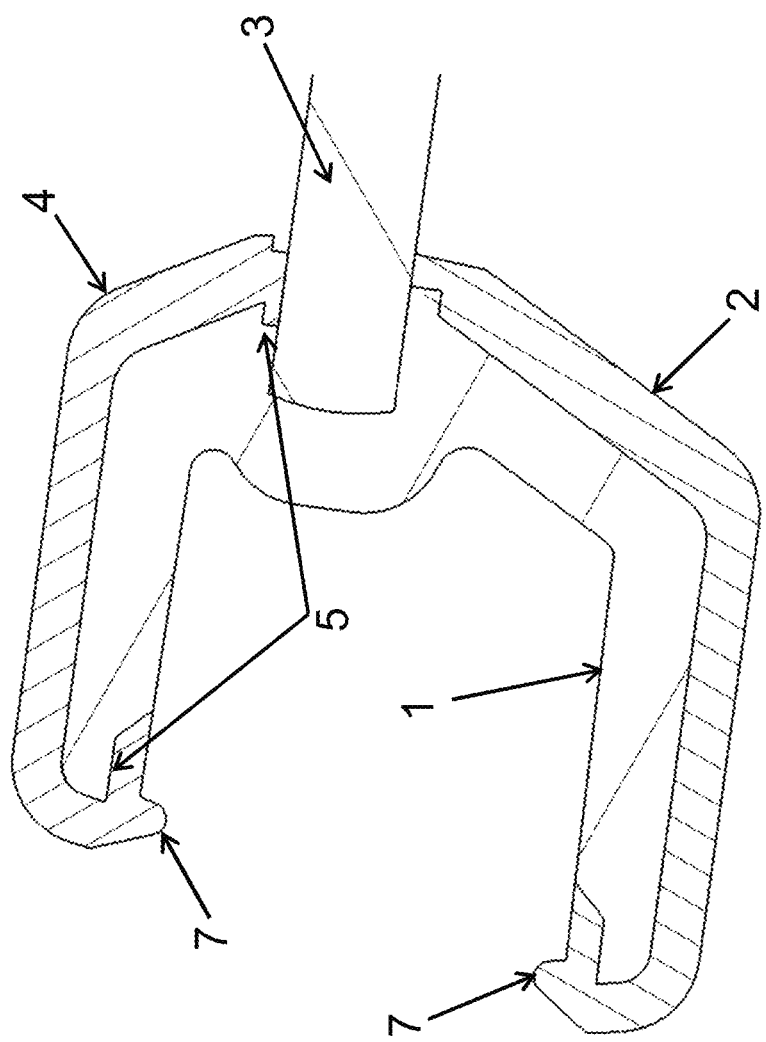
FIG. 3 illustrates a cross-sectional view of a window surround with an inserted window glass panel, in accordance with one or more embodiments.

As illustrated in FIG. 3, the first component 1 may comprise undercuts 5 formed therein. The third component 4 may be molded over the first component 1 in the section of the undercuts 5. In that way, the third component 4 fills the undercuts 5 of the first component 1. Therefore, each of the undercuts 5 can serve to fix the third component 4 to the first component 1. One of the undercuts 5 (right side of FIG. 3) is arranged directly adjacent to the window glass panel 3. In that way, the third component 4 which fills the undercut of the first component 1, is in direct contact with the window glass panel 3. Therefore, the trim strip, i.e., the third component 4, extends to the window glass panel 3 and is fixed right next to the window glass panel 3.

In accordance with one or more embodiments, as also illustrated in FIG. 3, the first component 1 may comprise a U-shaped frame that includes a pair of spaced apart arm members extending from a base member. The window glass panel 3 penetrates the outer surface of the base member of the U-shaped frame. In that way, the U-shaped frame of the first component 1 is a continuance of the plane of the window glass panel 3. The second component 2 and the third component 4 are molded over the first component 1 in such a way, that each of the second component 2 and the third component 4 are to directly contact or engage respective distal ends of the U-shaped frame. The second component 2 and/or the third component 4 may each have a nose 7 in the region which is to engage the respective distal ends of the U-shaped frame of the first component 1. In this arrangement, each nose 7 is to point towards the interior of the U-shaped frame.

Figure 4:
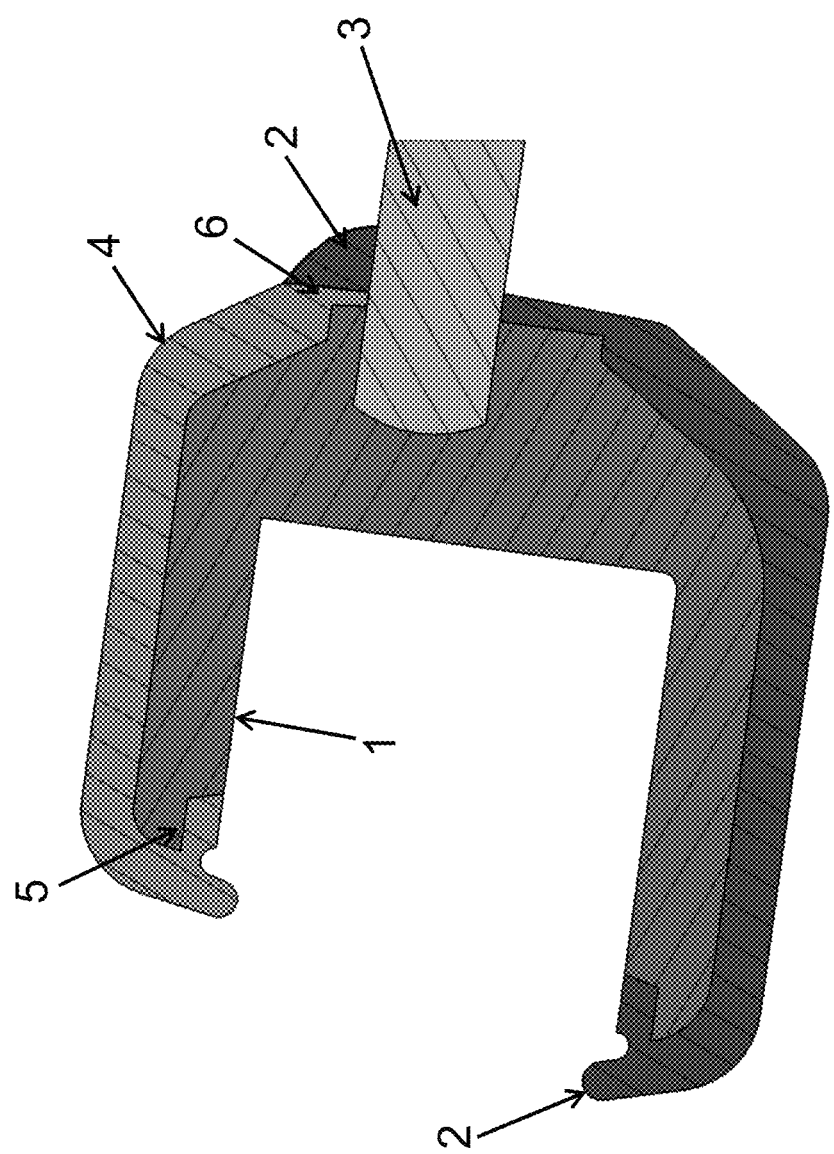
FIG. 4 illustrates a cross-sectional view of a window surround with an inserted window glass panel, in accordance with one or more embodiments.

As illustrated in FIG. 4, in accordance with one or more embodiments, a window surround differs from the embodiment of FIG. 3 essentially in that a first section 6 of the third component 4 is clamped between a section of the first component 1 and a section of the second component 2. Due to the molding of the second component 2 over the third component 4, the third component 4 is additionally fixed in the first section 6 between the first component 1 and the second component 2.

As illustrated in FIGS. 1 to 4, a window surround can be fabricated using a device which comprises a first cavity with a first injection unit for injection molding the first component 1 onto the window glass panel 3. The device may also comprise a second cavity with a second injection unit for over molding the second component 2 onto the first component 1. The second cavity can also have a third injection unit for over molding the third component 4 onto the first component 1. For producing the undercuts 5, retractable sliders can be used.

The terms "coupled," "attached," or "connected" may be used herein to refer to any type of relationship, direct or indirect, between the components in question, and may apply to electrical, mechanical, fluid, optical, electromagnetic, electromechanical or other connections. In addition, the terms "first," "second," etc. are used herein only to facilitate discussion, and carry no particular temporal or chronological significance unless otherwise indicated.

Those skilled in the art will appreciate from the foregoing description that the broad techniques of the embodiments can be implemented in a variety of forms. Therefore, while the embodiments have been described in connection with particular examples thereof, the true scope of the embodiments should not be so limited since other modifications will become apparent to the skilled practitioner upon a study of the drawings, specification, and following claims.

LIST OF REFERENCE SYMBOLS 1 first component
2 second component
3 window glass panel
4 third component
5 undercut
6 first section of the third component
7 nose

What is claimed is:

1. A method of manufacturing a window surround for a vehicle, the method comprising:
    injection molding a first component composed of a first material onto a window glass panel, the first component comprising a circumferential support frame to hold the window glass panel;
    injection molding, after injection molding the first component onto the window glass panel, a second component, composed of a second material of less hardness than the first material, onto the first component, the second component comprising a circumferential sealing element; and
    injection molding, after injection molding the first component onto the window glass panel but before or after injection molding the second component onto the first component, a third component composed of a high gloss material onto the first component.

2. The method of claim 1, wherein the third component comprises Polymethylmethacrylate (PMMA) or Alpha-Methylstyrene Acrylonitrile (AMSAM).

3. The method of claim 1, wherein the first component comprises Polypropylene (PP) with 30 percent glass fibre (PPGF30%).

4. The method of claim 3, wherein the second component comprises thermoplastic elastomer (TPE).

5. The method of claim 1, wherein:
    injection molding the first component comprises forming at least one undercut in the first component, and
    injection molding the third component comprises molding the third component onto the first component in a section of the undercut to fill the undercut.

6. The method of claim 1, wherein:
    injection molding the first component comprises forming at least one undercut in the first component directly adjacent to the window glass panel, and
    injection molding the third component comprises molding the third component onto the first component in a section of the undercut to fill the undercut and directly contact the window glass panel.

7. The method of claim 1, wherein:
    injection molding the third component comprises molding at least a first section of the third component over the first component, and
    injection molding the second component comprises molding the second component onto the third component.

8. The method of claim 1, wherein injection molding the first component comprises molding the first component as a U-shaped frame comprising a pair of spaced apart arm members extending from a base member.

9. The method of claim 8, wherein the window glass panel is to penetrate the base member of the U-shaped frame from an outer surface of the base member such that the U-shaped frame is a continuance of a plane of the window glass panel.

10. The method of claim 8, wherein injection molding the second component comprises molding the second component onto the first component to directly contact a distal end of a first arm member of the U-shaped frame.

11. The method of claim 10, wherein injection molding the third component comprises molding the third component onto the first component to directly contact a distal end of a second arm member of the U-shaped frame.

\* \* \* \* \*